Feb. 22, 1927.                                                            1,618,677
E. W. RICHARD ET AL
SCREW DEVICE
Filed Feb. 2, 1924
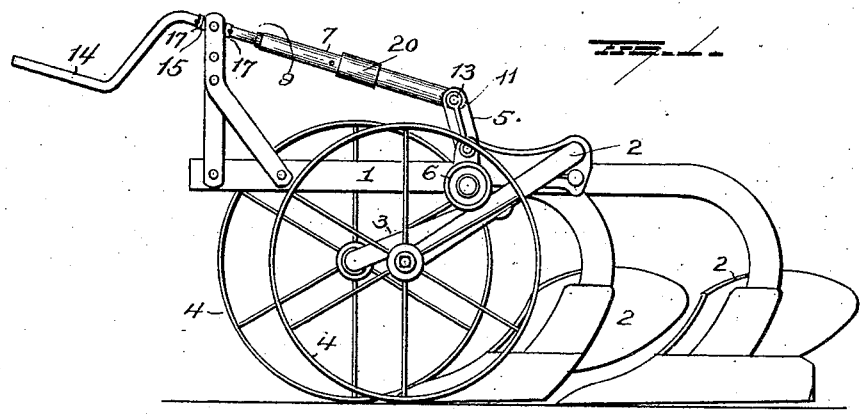
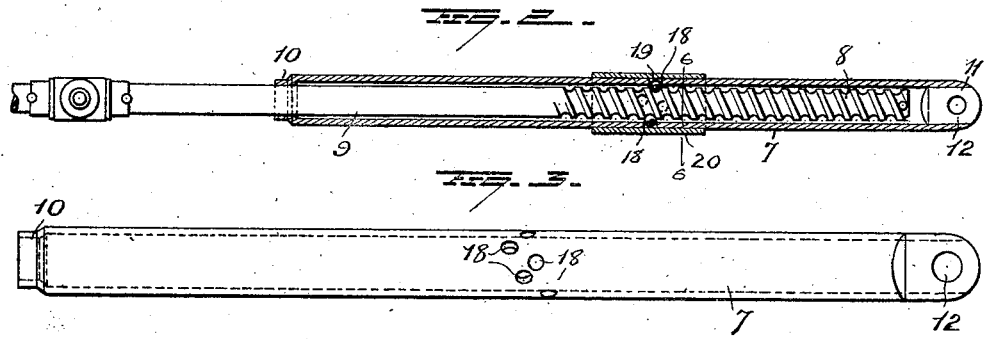
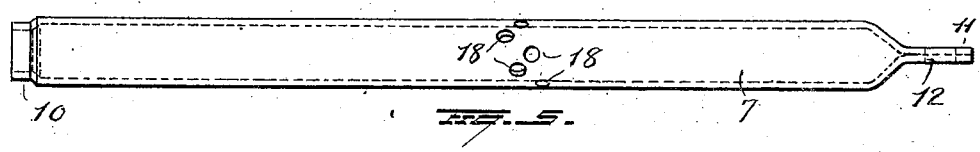
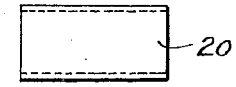
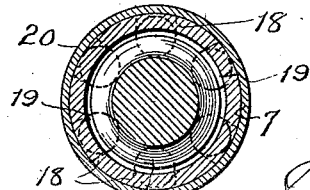
Inventors
E. W. Richard
E. J. Jauss
By Seymour & Bright
Attorneys Patented Feb. 22, 1927.

1,618,677

UNITED STATES PATENT OFFICE.

ERNEST W. RICHARD AND ERNEST J. JANSO, OF SOUTH BEND, INDIANA, ASSIGNORS TO OLIVER CHILLED PLOW WORKS, OF SOUTH BEND, INDIANA.

SCREW DEVICE.

Application filed February 2, 1924. Serial No. 690,292.

This invention relates to improvements in screw devices and particularly to such as are adaptable for use in adjusting mechanism for wheeled plows,—one object of the invention being to so construct the device at a minimum cost that it shall be efficient with the application of a minimum amount of applied power to move the frame of a plow or the beams which may constitute a part of the frame, to raise or lower the frame or beams and the plow bases carried by the latter to regulate the depth to which said plow bases may enter the ground.

With this and other objects in view, the invention consists in certain novel features as hereinafter set forth and pointed out in the claim.

In the accompanying drawings,—

Figure 1 is a side elevation of a plow structure showing an application of our improvements.

Figure 2 is an enlarged view in section, partly in elevation, showing the screw device.

Figure 3 is a view in elevation of the housing or tubular body portion of the screw device.

Figure 4 is a view in elevation taken at right angles to Figure 3.

Figure 5 is a detail view of the ball retaining member, and

Figure 6 is an enlarged sectional view on the line 6—6 of Figure 2.

In the drawings, we have illustrated the application of our improvements to a wheeled plow structure to adjust the same for depth of plowing. As here shown, the plow structure may comprise the plow frame 1, carrying plow bases 2, and on this frame crank-axle members 3 may be mounted and provided with suitable spindle portions which enter the hubs of carrying wheels 4. A lever 5, which may be mounted on the plow frame, carries a roller 6 to bear in the crank arm of one of the crank-axle members, and with this lever, one member of our improved screw device will be connected.

The screw device comprises a single steel tube or housing 7 into which a long-pitch screw 8 enters,—said screw constituting part of a shaft 9 which passes through the forward contracted end 10 of the tube or housing 7, the portion 10 of the tube or housing constituting a bearing for the shaft. The rear end of the tube or housing 7 is compressed so as to close the same and form a lug or projection 11 having a hole 12 through which a pin 13 passes to connect said tube or housing with the lever 5.

The forwardly projecting portion of the screw shaft 9 is provided with a crank 14 and between said crank and the forward end of the tube or housing 7, the screw shaft 9 passes freely through a sleeve 15, which latter is pivotally mounted at the upper portion of a standard 16 supported by the plow frame,—longitudinal movement of said shaft being prevented by collars 17 secured thereto at respective ends of the sleeve 15.

At an intermediate portion of the tube or housing 7, the same is provided with a spiral series of holes 18, such holes being preferably located at about the central portion of said tube or housing. The holes 18 serve to receive antifriction balls 19 with which the screw 8 is cooperable. To retain the balls 19 properly in place, a short length of tubing,—viz, a sleeve 20 embraces the central portion of the tube or housing and may be shrunk or otherwise made rigid to the latter.

With the use of our improvements, the application of a minimum amount of power and a comparatively few turns of the screw shaft will suffice to raise the comparatively heavy plow frame and adjustments of the plow for depth of plowing may be quickly made with comparatively slight exertion on the part of the operator.

Having fully described our invention what we claim and desire to secure by Letters Patent, is:

Screw adjusting means, comprising a tube closed at one end and adapted at such closed end for attachment to a part to be moved, a bearing formed at the other end of said tube, said tube having a spiral series of holes located at approximately the central portion of said tube, a shaft entering said tube and rotatable in the bearing at one end thereof, a portion of said shaft within the tube having a long-pitch screw thread, balls mounted in the holes in said tube and entering said screw thread, a sleeve encircling the central portion of the tube and directly engaging the same and preventing displacement of said balls, and means for preventing longitudinal movement of said shaft.

In testimony whereof, we have signed this specification.

ERNEST W. RICHARD.
ERNEST J. JANSO.